US010733763B2

(12) United States Patent
Lee et al.

(10) Patent No.: US 10,733,763 B2
(45) Date of Patent: Aug. 4, 2020

(54) MURA DETECTION DEVICE AND METHOD OF DETECTING MURA USING THE SAME

(71) Applicant: Samsung Display Co. Ltd., Yongin-si (KR)

(72) Inventors: Min Tak Lee, Hwaseong-si (KR); Kyu Seok Kim, Asan-si (KR); Soo Young Kim, Seoul (KR); Young Nam Yun, Suwon-si (KR); Hyun Koo Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 172 days.

(21) Appl. No.: 15/955,324

(22) Filed: Apr. 17, 2018

(65) Prior Publication Data

US 2019/0035112 A1    Jan. 31, 2019

(30) Foreign Application Priority Data

Jul. 31, 2017 (KR) .................. 10-2017-0097294

(51) Int. Cl.
*G06T 7/90* (2017.01)
*G06T 7/00* (2017.01)
(Continued)

(52) U.S. Cl.
CPC .............. *G06T 7/90* (2017.01); *G06T 7/001* (2013.01); *G06T 7/0008* (2013.01);
(Continued)

(58) Field of Classification Search
CPC ......... G06T 11/001; G06T 2207/10004; G06T 2207/10024; G06T 2207/20052;
(Continued)

(56) References Cited

U.S. PATENT DOCUMENTS

2010/0211551 A1* 8/2010 Ryu ...................... H04L 51/063
707/687

FOREIGN PATENT DOCUMENTS

KR    1020140067785    6/2014
KR    1020160031142    3/2016

OTHER PUBLICATIONS

Chen, Liang-Chia, and Chia-Cheng Kuo. "Automatic TFT-LCD mura defect inspection using discrete cosine transform-based background filtering and 'just noticeable difference' quantification strategies." Measurement Science and Technology 19.1 (2007): 015507. (Year: 2007).*

(Continued)

*Primary Examiner* — Nirav G Patel
(74) *Attorney, Agent, or Firm* — Cantor Colburn LLP

(57) ABSTRACT

A mura detection device includes an XYZ coordinate system conversion unit which receives a photographed image of a display device and converts the photographed image into XYZ image data according to XYZ chromatic coordinates, a background image generation unit which generates background image data obtained by removing a part of the XYZ image data, a color difference calculation unit which generates color difference image data by comparing the photographed image and the background image data, and a mura data generation unit which calculates a color mura index value using the color difference image data.

18 Claims, 15 Drawing Sheets

(51) Int. Cl.
  *G06T 11/00*   (2006.01)
  *G09G 3/00*   (2006.01)
(52) U.S. Cl.
  CPC ............ *G06T 11/001* (2013.01); *G09G 3/006* (2013.01); *G06T 2207/10004* (2013.01); *G06T 2207/10024* (2013.01); *G06T 2207/20052* (2013.01); *G06T 2207/30121* (2013.01); *G09G 2360/145* (2013.01)
(58) Field of Classification Search
  CPC ......... G06T 2207/30121; G06T 7/0008; G06T 7/001; G06T 7/90; G09G 2360/145; G09G 3/006
  See application file for complete search history.

(56) References Cited

OTHER PUBLICATIONS

Kandi, Saeideh Gorji. "Automatic defect detection and grading of single-color fruits using HSV (Hue, Saturation, Value) color space." Journal of Life Science 4.7 (2010): 39-45. (Year: 2010).*
Mintak Lee, et al., "A New Method for Color Mura Quantification", SID Symposium Digest of Technical Papers, (Jun. 2, 2017), vol. 48, Issue 1, pp. 1-3.

\* cited by examiner

MURA DETECTION DEVICE AND METHOD OF DETECTING MURA USING THE SAME

This application claims priority to Korean Patent Application No. 10-2017-0097294, filed on Jul. 31, 2017, and all the benefits accruing therefrom under 35 U.S.C. § 119, the content of which in its entirety is herein incorporated by reference.

BACKGROUND

1. Field

Exemplary embodiments of the invention relate to a mura detection device and a method of detecting mura using the same.

2. Description of the Related Art

Recently, with a development of portable electronic appliances and fixed electronic appliances, demand for display devices mounted on these electronic appliances has increased rapidly.

These display devices include various types of display devices such as liquid crystal display devices and organic light emitting display devices. Such a display device is desired to check whether it has been manufactured without defects after manufacturing this display device. In particular, as one of the defects, a phenomenon of mura occurring in the display device may be exemplified. The "mura" refers to a stain, which means a defect in which a luminance of a specific region or portion of a screen is unevenly displayed when an entire screen is displayed with a constant gray scale.

Methods of inspecting the occurrence of mura may be classified into methods of inspecting the occurrence of mura with the naked eyes of an engineer and methods of inspecting the occurrence of mura by an automation process using a mura detection device.

SUMMARY

A method of inspecting an occurrence of mura with naked eyes of an engineer and a method of inspecting the occurrence of mura by an automation process using a mura detection device may be different from each other in result values. Thus, there has been a problem that a case where a display device not having been determined to be defective in the mura inspection by the naked eye of an engineer is determined to be defective in the mura inspection by an automation process using a mura detection device may occur, or a case opposite thereto may occur.

Accordingly, in order to solve the above problem, an exemplary embodiment of the invention is to provide a mura detection device, which minimizes the difference in result value between the mura inspection by the naked eye of an engineer and the mura inspection by an automation process using a mura detection device.

Another exemplary embodiment of the invention is to provide a method of detecting mura using the mura detection device, which minimizes the difference in result value between the mura inspection by the naked eye of an engineer and the mura inspection by an automation process using a mura detection device.

However, exemplary embodiments of the invention are not restricted to the one set forth herein. The above and other exemplary embodiments of the invention will become more apparent to one of ordinary skill in the art to which the invention pertains by referencing the detailed description of the invention given below.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
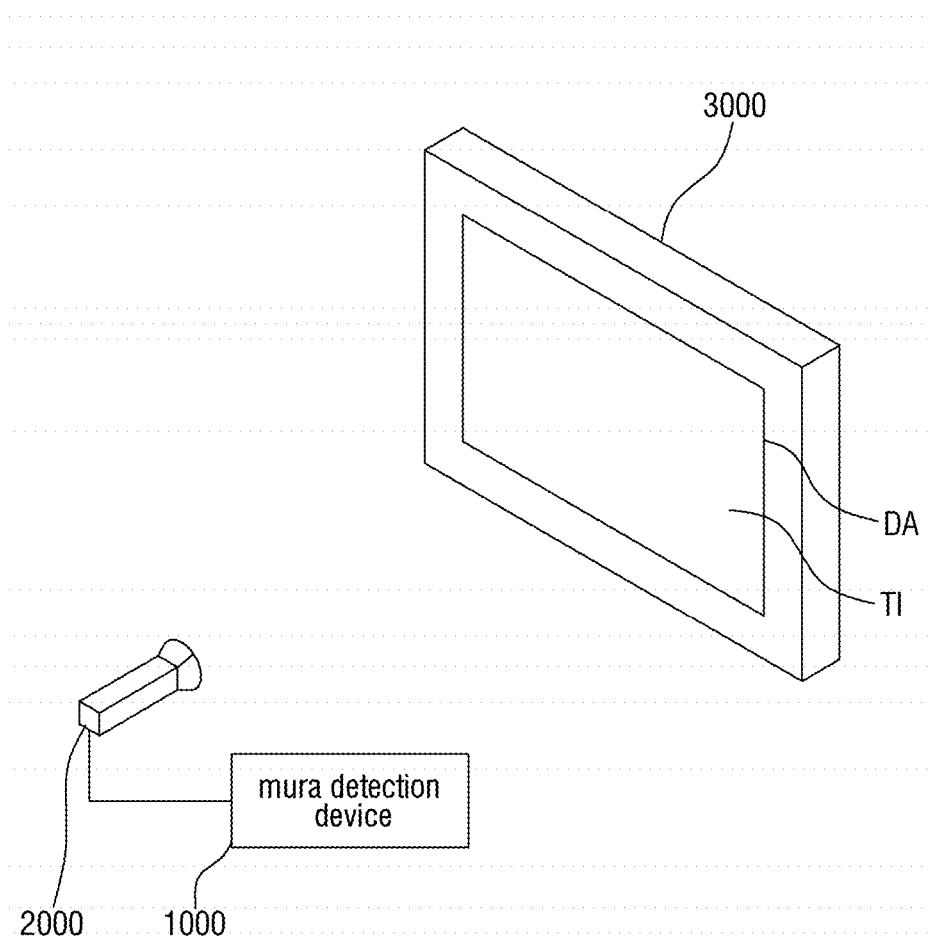
FIG. 1 is a schematic view illustrating an exemplary embodiment of a method of detecting mura using a mura detection device according to the invention.

The invention will now be described more fully hereinafter with reference to the accompanying drawings, in which preferred embodiments of the invention are shown. This invention may, however, be embodied in different forms and should not be construed as limited to the exemplary embodiments set forth herein. Rather, these embodiments are provided so that this disclosure will be thorough and complete, and will filly convey the scope of the invention to those skilled in the art. The same reference numbers indicate the same components throughout the specification. In the attached drawing figures, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the drawing figures. It will be understood that the spatially relative terms are intended to encompass different orientations of the device in use or operation in addition to the orientation depicted in the drawing figures. For example, if the device in the drawing figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, preferred embodiments of the invention will be described in detail with reference to the accompanying drawings.

FIG. 1 is a schematic view illustrating a method of detecting mura using a mura detection device according to an exemplary embodiment of the invention.

Referring to FIG. 1, a mura detection device 1000 according to an exemplary embodiment of the invention is connected with a photograph device 2000.

The photograph device 2000 photographs a display device 3000, in which a test image TI is displayed on a display area DA, using a camera, for example, and provides a photographed image PI to the mura detection device 1000. The photograph device 2000 may be implemented by a meter or an image sensor equipped with a filter having the same transmission spectrum as an XYZ color matching function.

Here, the test image TI may be a monochromatic image having any grayscale value for effectively performing mura detection or an image having a predetermined specific pattern. In an exemplary embodiment, the test image TI may be a white image having a maximum grayscale value, and may be an image set in which a red image having a maximum grayscale value, a green image, and a blue image are sequentially output, for example.

The mura detection device 1000 determines whether or not mura has occurred in the display device 3000 on the basis of the data on the test image TI provided from the photograph device 2000.

Figure 2:
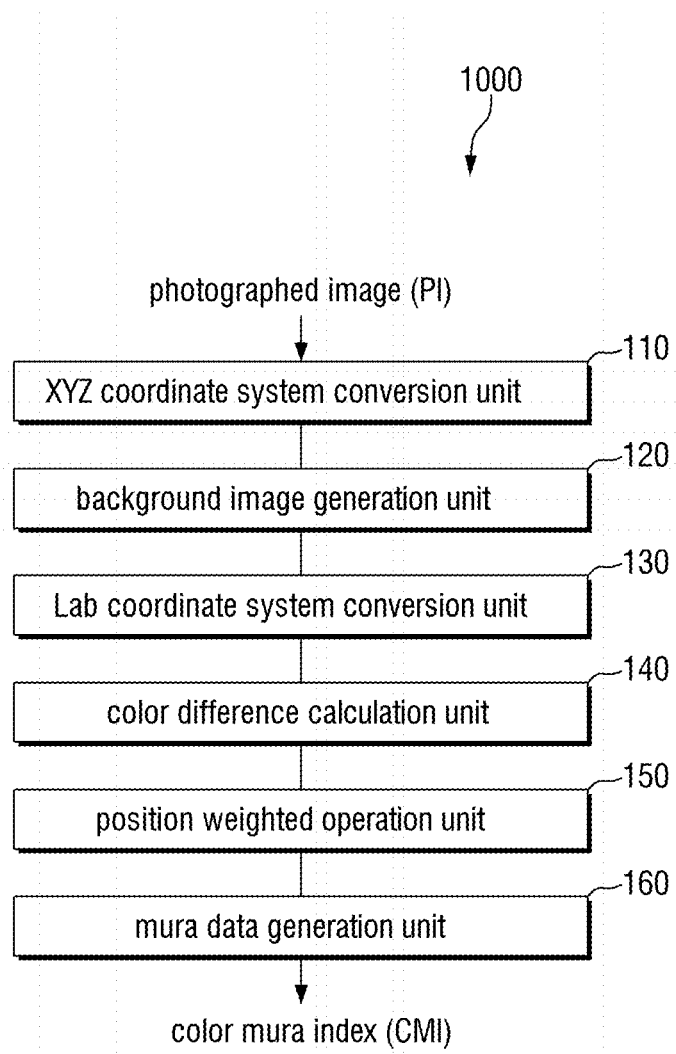
FIG. 2 is a block diagram of a mura detection device according to an exemplary embodiment of the invention.
Figure 3:
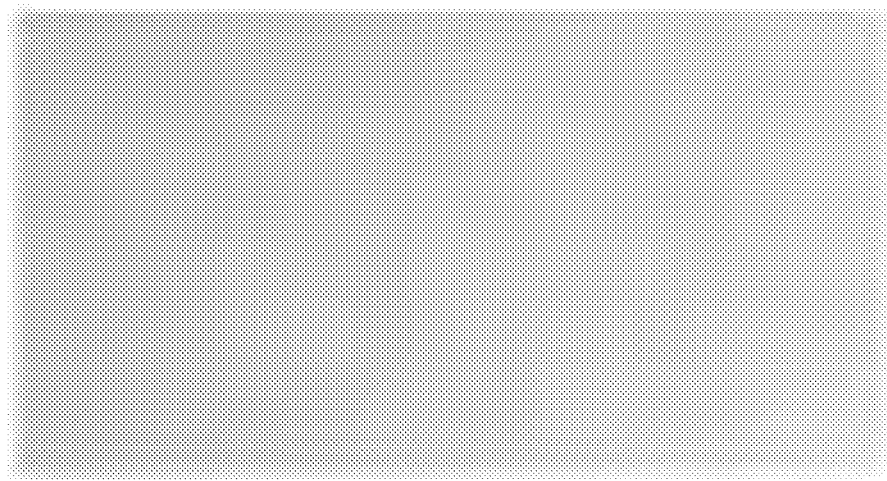
FIG. 3 is an exemplary image implemented by XYZ image data.
Figure 4:
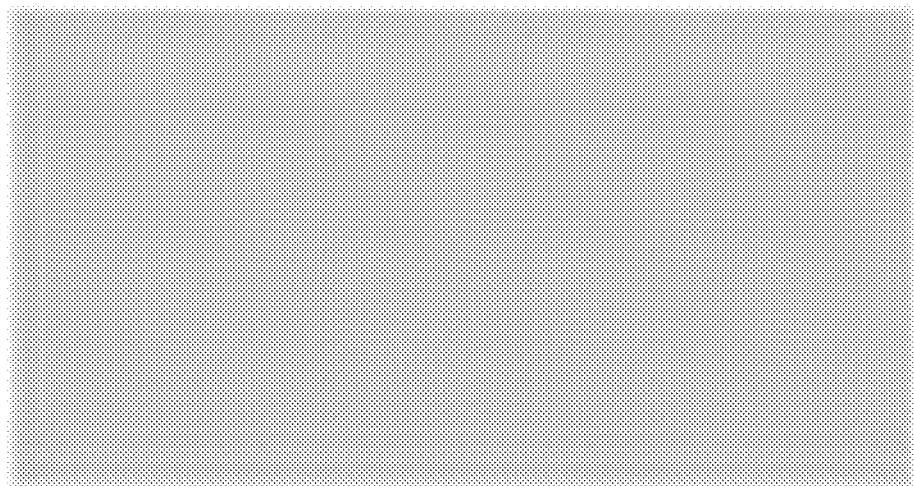
FIG. 4 is an exemplary image implemented by background image data.
Figure 5:
FIG. 5 is an exemplary image implemented by color difference image data.
Figure 6:
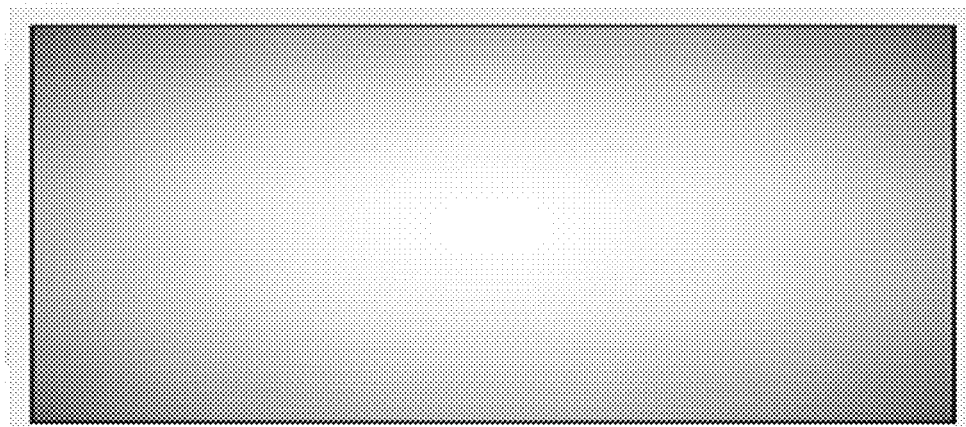
FIG. 6 is an exemplary image implemented by position weighted image data.
Figure 7:
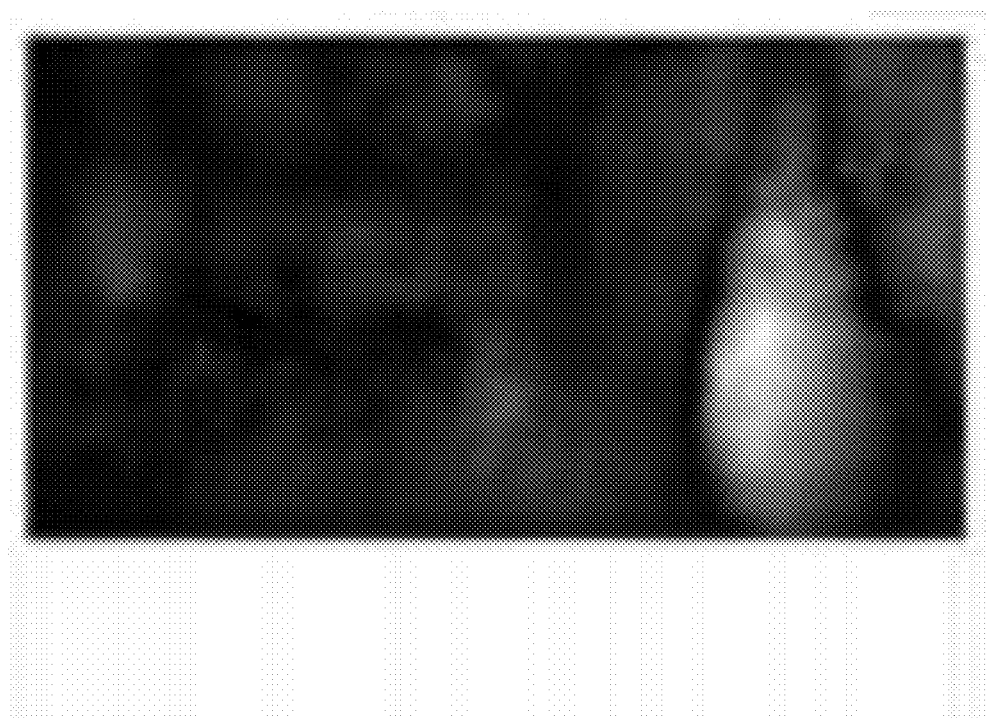
FIG. 7 is an exemplary image implemented by mura image data.

FIG. 2 is a block diagram of a mura detection device according to an exemplary embodiment of the invention, FIG. 3 is an exemplary image implemented by XYZ image data, FIG. 4 is an exemplary image implemented by background image data, FIG. 5 is an exemplary image implemented by color difference image data, FIG. 6 is an exemplary image implemented by position weighted image data, and FIG. 7 is an exemplary image implemented by mura image data.

Referring to FIG. 2, the mura detection device 1000 includes an XYZ coordinate system conversion unit 110, a background image generation unit 120, a Lab coordinate system conversion unit 130, a color difference calculation unit 140, a position weighting operation unit 150, and a mura data generation unit 160.

The XYZ coordinate system conversion unit 110 generates XYZ image data (XID) converted into XYZ chromatic coordinates using a photographed image PI provided from the photograph device 2000.

Here, X, Y, and Z in the XYZ color coordinates may mean trichromatic stimulus values, which are colors similar to red, green, and blue, respectively. These values correspond to values considering the cognitive abilities of cone cells constituting human eyes.

The values according to the XYZ coordinate system may be calculated by the following equations.

$$X = \int_0^\infty I(\lambda)\bar{x}(\lambda)d\lambda \qquad \text{Math Equation (1)}$$

$$Y = \int_0^\infty I(\lambda)\bar{y}(\lambda)d\lambda \qquad \text{Math Equation (2)}$$

$$Z = \int_0^\infty I(\lambda)\bar{z}(\lambda)d\lambda \qquad \text{Math Equation (3)}$$

Here, $\bar{x}(\lambda)$, $\bar{y}(\lambda)$, and $\bar{z}(\lambda)$ are response functions of cone cells to trichromatic stimulus values, respectively, and $I(\lambda)$ is a spectral output distribution function.

In an exemplary embodiment, when the display device 3000 includes pixels having an N*M matrix structure where N and M are natural numbers, the XYZ coordinate system conversion unit 110 may calculate trichromatic stimulus values of X, Y, Z for each position corresponding to each pixel, and may output XYZ image data (XID) including information about the trichromatic stimulus values at the position corresponding to each pixel, for example. That is, the XYZ image data (XID) may include two-dimensional data for each of the trichromatic stimulus values composed of X, Y, and Z. In an exemplary embodiment, the image implemented by the XYZ image data (XID) may be the image shown in FIG. 3, for example.

The XYZ coordinate system conversion unit 110 may provide the generated XYZ image data (XID) to the background image generation unit 120 and the Lab image data (LID) generation unit.

The background image generation unit 120 generates background image data (BID) for comparison with the XYZ image data (XID) using the XYZ image data (XID) provided from the XYZ coordinate system conversion unit 110.

Here, the background image data (BID) may be data about an image for further emphasizing the mura included in the XYZ image data (XID) through comparison with the XYZ image data (XID) which is original data.

Specifically, in order to generate the background image data (BID), discrete cosine transform (DCT) is performed on the entire image area of the XYZ image data (XID) which is original data. The discrete cosine transform (DCT) may be a method of transforming the entire image so as to observe the entire image in a frequency form.

Thereafter, some of high-frequency components are removed from the XYZ image data (XID) subjected to the discrete cosine transform (DCT). In other words, it is possible to remove data of some rows and some columns in which characteristics of high-frequency components are reflected in each row and column of the XYZ image data (XID) subjected to discrete cosine transform (DCT).

Thereafter, inverse discrete cosine transform (IDCT) is performed on the data from which high-frequency components have been removed, so as to generate background image data (BID).

The background image data (BID), similarly to the XYZ image data (XID) which is original data, may include two-dimensional data for each of the trichromatic stimulus values composed of X, Y and Z. However, comparing the background image data (BID) with the XYZ image data (XID) which is original data, in the background image data (BID), data for local mura having occurred in a very narrow range, that is, data for very small mura may be removed, and only data for mura having occurred in a relatively wide range may remain. In an exemplary embodiment, the image implemented by the background image data (BID) may be the image shown in FIG. 4, for example.

The Lab coordinate system conversion unit 130 may receive the XYZ image data (XID) through the XYZ coordinate system conversion unit 110 or the background image generation unit 120, may receive the background image data (BID) through the background image generation unit 120, may generate Lab image data (LID), and may generate Lab background image data (LBD).

That is, the Lab coordinate system conversion unit 130 may generate the Lab image data (LID) obtained by converting the XYZ image data (XID) into data according to the XYZ chromatic coordinates without performing separate correction on the photographed image (PI).

Further, the Lab coordinate system conversion unit 130 may generate the Lab background data (LBD) obtained by converting the background image data (BID), which is data according to the XYZ chromatic coordinates, into data according to the Lab chromatic coordinates after performing correction for comparison on the photographed image (PI).

Here, the Lab chromatic coordinates, which are chromaticity values defined by International Lighting Commission ("CIE"), are a color space, which can approximately match the color difference being able to be detected by the human eye with the color difference expressed by a numerical value in the color space. The Lab chromatic coordinates, which are uniform color space coordinates, are a color space that is currently standardized globally, because the Lab chromatic coordinates provide a color space that is very similar to the human eye.

From the XYZ chromatic coordinates, the Lab chromatic coordinates can be converted by the following equations.

$$L^* = 116 f(Y/Y_n) - 16 \qquad \text{Math Equation (4)}$$

$$a^* = 500[f(X/X_n) - f(Y/Y_n)] \qquad \text{Math Equation (5)}$$

$$b^* = 200[f(Y/Y_n) - f(Z/Z_n)] \qquad \text{Math Equation (6)}$$

Here, Xn, Yn, and Zn are values obtained by normalizing CIE XYZ with respect to a standard white color.

The components in the Lab chromatic coordinates are represented by $L^*$, $a^*$, and $b^*$, respectively. $L^*$ represents lightness, $a^*$ represents the degree of inclusion of red and green components, and $b^*$ represents the degree of inclusion of yellow and blue components. The Lab chromatic coordinates may not be a complete sphere form. The green system has a short distance from the center, and the red system has a relatively longer distance from the center than that of the green system. Here, $L^*$ is a numerical value representing lightness. $L^*=100$ is white, and $L^*=0$ is black, for example. $a^*=80$ appears redder than $a^*=50$, and $b^*=50$ appears to include more yellow components than $b^*=20$, for example. The difference of color in the Lab chromatic coordinates is referred to as a three-dimensional ("3D") distance between two color positions in the color space similar to the sphere. When the 3D distances are increasingly different from each other, color difference becomes large, and when the 3D distance is little different from each other, the same color is recognized.

The color difference calculation unit 140 receives the Lab image data (LID) and the Lab background image data (LBD) from the Lab coordinate system conversion unit 130 and compares the Lab image data (LID) and the Lab background image data (LBD) to generate color difference image data (CID).

Specifically, the color difference calculation unit 140 calculates a color difference using the Lab image data (LID) and the Lab background image data (LBD) based on the DE2000 standard, thereby generating the color difference image data (CID) including information about a color difference between the Lab image data (LID) and the Lab background image data (LBD).

The DE2000 standard corresponds to a standard color difference equation for comparing the color difference in the Lab color space, and may be operated by the following equation.

$$\Delta E = \sqrt{\Delta L^{*2} + \Delta a^{*2} + \Delta b^{*2}} \qquad \text{Math Equation (7)}$$

Here, $\Delta E$ denotes the color difference between the Lab image data (LID) and the Lab background image data (LBD) for the corresponding coordinates on an image, $\Delta L^*$ denotes the difference between the $L^*$ component of the Lab image data (LID) and the $L^*$ component of the Lab background image data (LBD) for the corresponding coordinates on an image, $\Delta a^*$ denotes the difference between the $a^*$ component of the Lab image data (LID) and the $a^*$ component of the Lab background image data (LBD) for the corresponding coordinates on an image, and $\Delta b^*$ denotes the difference between the $b^*$ component of the Lab image data (LID) and the b* component of the Lab background image data (LBD) for the corresponding coordinates on an image.

Further, the color difference image data (CID) may be calculated by using only the color difference ΔE between the Lab image data (LID) and the Lab background image data (LBD) for the corresponding coordinates on an image. The image implemented using the color difference image data (CID) may be an image in which the mura occurring in the display device 3000 is emphasized. In particular, since the color difference comparison according to the DE2000 standard considers not only luminance but also color difference, the color difference image data (CID) can reflect not only the mura due to luminance difference but also the mura due to color difference.

Moreover, since the background image data (BID) used to calculate the color difference image data (CID) is data for an image in which high-frequency components are removed by discrete cosine transform and inverse discrete cosine transform, it is possible to effectively emphasize the mura formed over a wide area of an image. In an exemplary embodiment, the image implemented by the color difference image data (CID) may be the image shown in FIG. 5, for example.

The position weighting operation unit 150 receives the color difference image data (CID) from the color difference calculation unit 140 and combines the color difference image data (CID) with position weighted image data (PWD) to generate mura image data (MID).

That is, the position weighted image data (PWD) for matching with a human's cognitive ability is additionally combined with the color difference image data (CID) in which the mura of the image displayed on the display device 3000 is emphasized, so as to generate the mura image data (MID).

The image implemented by the position weighted image data (PWD) may be an image in which its luminance decreases as the position is farther from the center, in other words, an image which becomes darker as the position is farther from the center. In an exemplary embodiment, the image implemented by the position weighted image data (PWD) may be the image shown in FIG. 6, for example.

The human's cognitive ability can distinguish the stain formed at the center of the display area DA better than the stain formed at the edge of the display area DA. Therefore, in the mura detection device 100, in order to emphasize the stains formed at the center of the display area DA and to make the stains formed on the edges of the display area DA faint, the color difference image data (CID) may be combined with the aforementioned position weighted image data (PWD).

Here, the meaning of 'combining' the color difference image data (CID) with the position weighted image data (PWD) may mean convoluting the color difference image data (CID) and the position weighted image data (PWD).

The image implemented by the mura image data (MID) formed by convoluting the color difference image data (CID) and the position weighted image data (PWD) may be, for example, the image shown in FIG. 7.

The mura detection device 1000 may receive the mura image data (MID) from the position weighting operation unit 150 and detect mura.

The mura detection device 1000 may measure the maximum luminance included in the mura image data (MID).

More specifically, the mura detection device 1000 detects luminance at a point having the highest luminance in the image implemented by the mura image data (MID) and outputs the luminance as a color mura index (CMI) value. The high luminance in the image implemented by the mura image data MID means that the difference in luminance or color between the image implemented by the XYZ image data (XID) and the image implemented by the background image data (BID) is large, which means that there is a high possibility of allowing a user to recognize stains. In other words, the higher the color mura index (CMI) value, the higher the possibility of the stains formed on the display device 3000 being visible to the user, and simultaneously, the higher the possibility of the display device 3000 having a mura defect.

Figure 8:
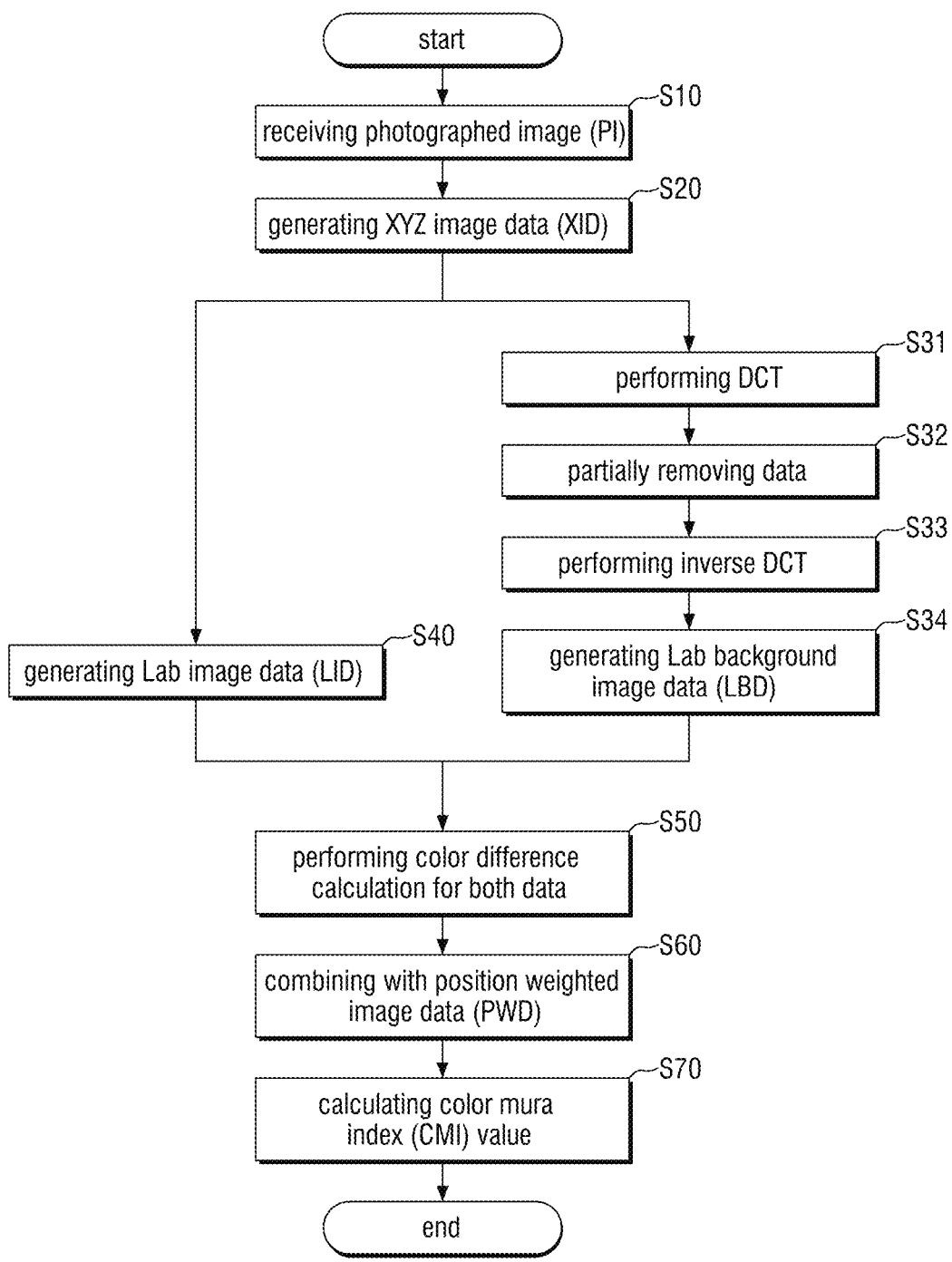
FIG. 8 is a flowchart illustrating a method of detecting mura using the mura detection device shown in FIG. 2.

FIG. 8 is a flowchart illustrating a method of detecting mura using the mura detection device shown in FIG. 2.

Referring to FIGS. 1, 2 and 8, the photograph device 2000 photographs the display device 3000, in which a test image TI is displayed, to form a photographed image PI, and the XYZ coordinate system conversion unit 110 receives the photographed image PI (S10).

Next, the XYZ coordinate system conversion unit 110 converts data of the photographed image PI into XYZ image data (XID) which is data according to the XYZ coordinate system (S20).

Next, the background image generation unit 120 performs discrete cosine transform (DCT) on the provided XYZ image data (XID) (S31), removes some data (S32), and then performs inverse discrete cosine transform (DCT) again to generate background image data (BID) (S33).

Next, the Lab coordinate system conversion unit 130 receives the background image data (BID) from the background image generation unit 120, and converts the received background image data (BID) into a Lab coordinate system to generate Lab background image data (LBD) (S34).

Simultaneously, the Lab coordinate system conversion unit 130 converts the XYZ image data (XID) received from the XYZ coordinate system conversion unit 110 or the background image generation unit 120 into the Lab coordinate system to generate Lab image data (LID) (S40).

Next, the color difference calculating unit 140 receives the Lab image data (LID) and the Lab background image data (LBD) from the Lab coordinate system converting unit 130, and performs color difference calculation according to the DE2000 standard to generate color difference image data (CID) (S50).

Next, the position weighting operation unit 150 receives the color difference image data (CID) from the color difference calculation unit 140, and combines the received color difference image data (CID) with position weighted image data (PWD) to generate mura image data (MID) (S60).

Next, the mura data generation unit 160 receives the mura image data (MID) from the position weighting operation unit 150, and analyzes the received mura image data (MID) to calculate a color mura index (CMI) value (S70).

Figure 9:
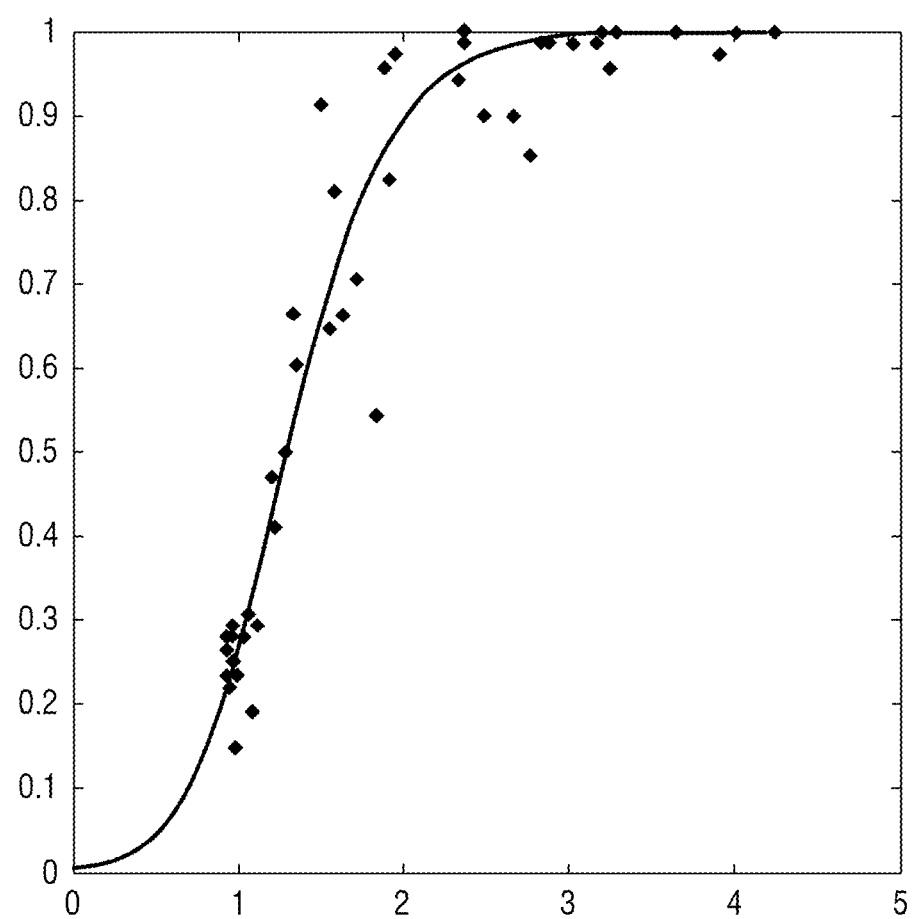
FIG. 9 is a graph comparing a color mura index value calculated by the mura detection device shown in FIG. 2 with a mura defect recognition rate of a person.

FIG. 9 is a graph comparing a color mura index value calculated by the mura detection device shown in FIG. 2 with a mura defect recognition rate of a person.

The x-axis in FIG. 9 represents a color mura index (CMI) value calculated by the mura detection device 1000, and the y-axis in FIG. 9 represents a mura defect recognition ratio of a person to the color mura index (CMI) value.

In an exemplary embodiment, when a display device having a color mura index (CMI) value of 1 has a mura defect recognition ratio of 0.2, a person determines as experimental results that, among the ten display devices having a color mura index (CMI) value of 1, the two display devices have mura defects, for example.

Further, the points expressed on the xy coordinate plane represent experimental values of the mura recognition rate of a person with respect to a display device having the corresponding color mura index (CMI) value, and the curved line expressed on the xy coordinate plane represents a logistic curve of the aforementioned experimental values.

Referring to FIG. 9, it can be ascertained that the points expressed on the xy coordinate plane, which are actual experimental values, are located adjacent to the logistic curve. In other words, it can be ascertained that a person also recognizes mura defects at a ratio corresponding to the color mura index (CMI) value calculated by the mura detection device 1000.

Figure 10:
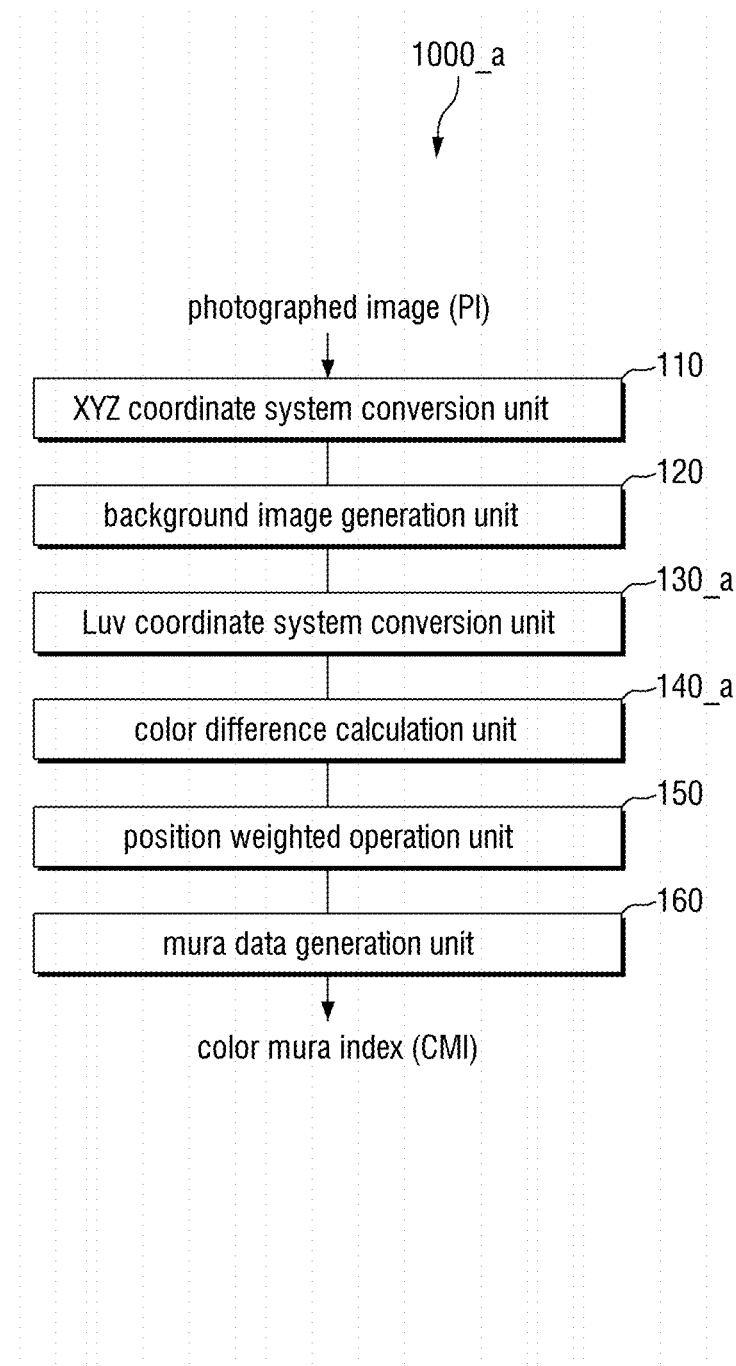
FIG. 10 is a block diagram of another exemplary embodiment of a mura detection device according to the invention.

FIG. 10 is a block diagram of a mura detection device according to another exemplary embodiment of the invention.

In FIG. 10, a description of configurations and reference numerals the same as those having been described in FIG. 2 will be omitted.

Referring to FIG. 10, the mura detection device 1000_a according to this exemplary embodiment includes an XYZ coordinate system conversion unit 110, a background image generation unit 120, a Luv coordinate system conversion unit 130_a, a color difference calculation unit 140_a, a position weighting operation unit 150, and a mura data generation unit 160.

The mura detection device 1000_a according to this exemplary embodiment is different from the mura detection device 1000 shown in FIG. 2, in that the Luv coordinate system conversion unit 130_a is provided instead of the Lab coordinate system conversion unit 130, and the operation method in the color difference calculation unit 140 is different.

The Luv coordinate system conversion unit 130_a of the mura detection device 1000 according to this exemplary embodiment may receive XYZ image data (XID) through the XYZ coordinate system conversion unit 110 or the background image generation unit 120, may receive background image data (BID) through the background image generation unit 120, may generate Luv image data (UID), and may generate Luv background image data (UBD).

That is, the Luv coordinate system conversion unit 130_a may generate the Luv image data (UID) obtained by converting the XYZ image data (XID) into data according to the Luv chromatic coordinates without performing separate correction on the photographed image (PI).

Further, the Luv coordinate system conversion unit 130_a may generate the Luv background data (UBD) obtained by converting the background image data (BID), which is data according to the XYZ chromatic coordinates, into data according to the Luv chromatic coordinates after performing correction for comparison on the photographed image (PI).

Here, the Luv chromatic coordinates, which are chromaticity values defined by CIE, are referred to CIELUV. The Luv chromatic coordinates can be converted from the values due to the XYZ chromatic coordinates. The Luv chromatic coordinates can be converted by the following Equations.

$$L^* = \begin{cases} \left(\frac{29}{3}\right)^3 Y/Y_n, & Y/Y_n \le \left(\frac{6}{29}\right)^3 \\ 116(Y/Y_n)^{1/3} - 16, & Y/Y_n > \left(\frac{6}{29}\right)^3 \end{cases}$$ Math Equation (8)

$$u^* = 13L^* \cdot (u' - u'_n)$$ Math Equation (9)

$$v^* = 13L^* \cdot (v' - v'_n)$$ Math Equation (10)

$$u' = \frac{4X}{X + 15Y + 3Z}$$ Math Equation (11)

$$v' = \frac{9Y}{X + 15Y + 3Z}$$ Math Equation (12)

Here, the values of X, Y, and Z denote the values of X, Y, and Z, respectively, according to the XYZ coordinate system, and $u'_n$ and $v'_n$ denote the coordinates of a white point in the (u', v') chromaticity diagram, respectively. The (u', v') chromaticity diagram corresponds to the standardized color region published under the name "CIE 1976 UCS (uniform chromaticity scale) diagram" by CIE.

The color difference calculation unit 140_a according to this exemplary embodiment receives the Luv image data (UID) and the Luv background image data (UBD) from the Luv coordinate system conversion unit 130_a and compares the Luv image data (UID) and the Luv background image data (UBD) to generate color difference image data (CID).

Specifically, the color difference calculation unit 140_a calculates a color difference using the Luv image data (UID) and the Luv background image data (UBD) based on Δu'v' standard, thereby generating the color difference image data (CID) including information about a color difference between the Luv image data (UID) and the Luv background image data (UBD). That is, unlike the color difference calculation unit 140 shown in FIGS. 2 and 8 calculating a color difference based on the DE2000 standard, the color difference calculation unit 140_a according to this exemplary embodiment calculates a color difference based on the Δu'v' standard.

The Δu'v' standard corresponds to a standard color difference Equation for comparing the color difference in the Luv color space, and may be operated by the following equation.

$$\Delta E = \sqrt{(\Delta u')^2 + (\Delta v')^2}$$ Math Equation (12)

Here, ΔE denotes the color difference between the Luv image data (UID) and the Luv background image data (UBD) for the corresponding coordinates on an image, Δu' denotes the difference between the u' component of the Luv image data (UID) and the u' component of the Luv background image data (UBD) for the corresponding coordinates on an image, and Δv' denotes the difference between the v' component of the Luv image data (UID) and the v' component of the Luv background image data (UBD) for the corresponding coordinates on an image.

Moreover, the color difference image data (CID) may be calculated by using only the color difference ΔE between the Luv image data (UID) and the Luv background image data (UBD) for the corresponding coordinates on an image. The image implemented using the color difference image data (CID) may be an image in which the mura occurring in the display device is emphasized. In particular, the color difference comparison according to the Δu'v' standard is advantageous in that the difference in luminance can be excluded, and the difference in color stain can be clearly compared.

Figure 11:
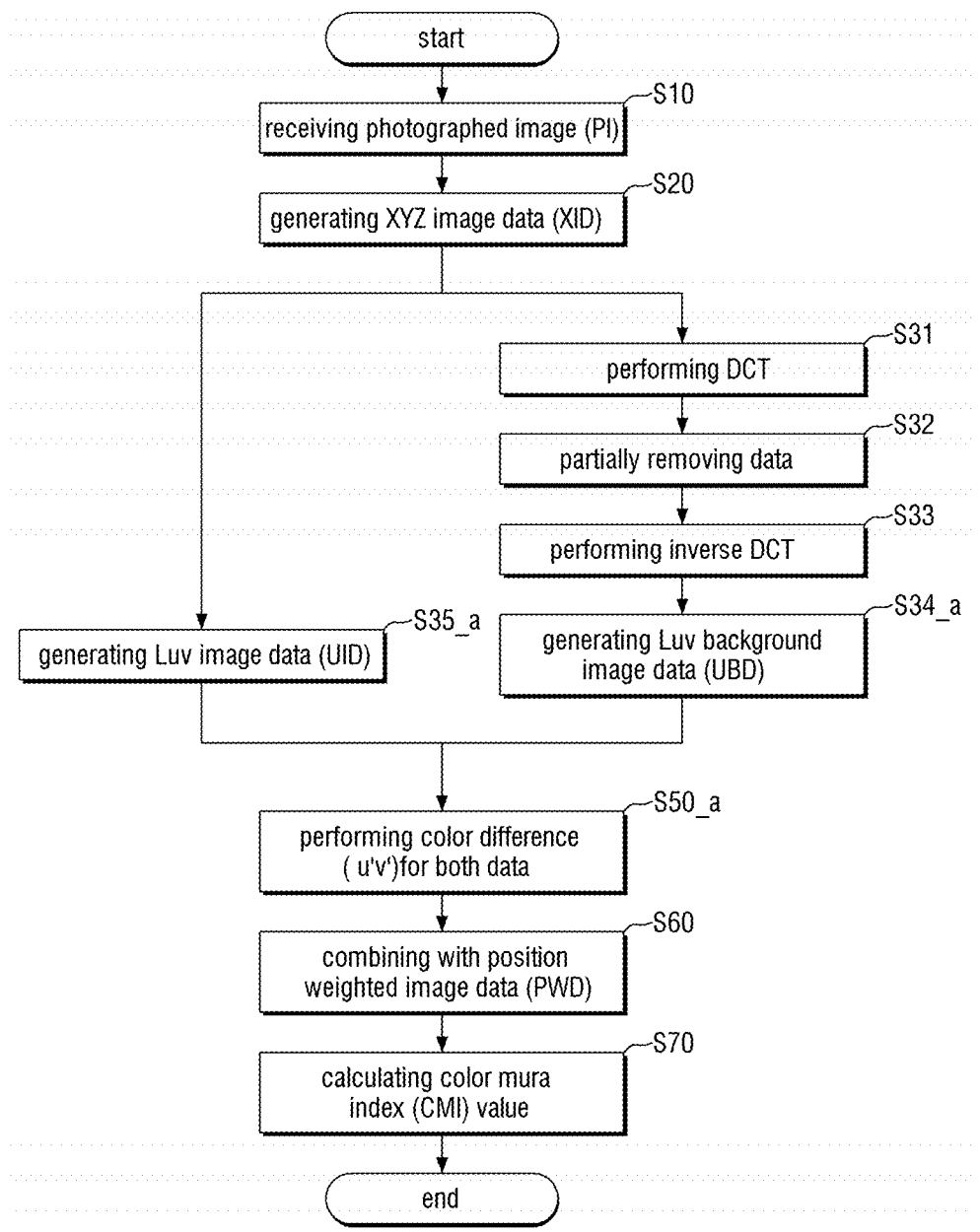
FIG. 11 is a flowchart illustrating a method of detecting mura using the mura detection device shown in FIG. 10.

FIG. 11 is a flowchart illustrating a method of detecting mura using the mura detection device shown in FIG. 10.

Referring to FIGS. 1, 10 and 11, the photograph device 2000 photographs the display device 3000, in which a test image TI is displayed, to form a photographed image PI, and the XYZ coordinate system conversion unit 110 receives the photographed image PI (S10).

Next, the XYZ coordinate system conversion unit 110 converts data of the photographed image PI into XYZ image data (XID) which is data according to the XYZ coordinate system (S20).

Next, the background image generation unit 120 performs discrete cosine transform (DCT) on the provided XYZ image data (XID) (S31), removes some data (S32), and then performs inverse discrete cosine transform (DCT) again to generate background image data (BID) (S33).

Next, the Luv coordinate system conversion unit 130_a receives the background image data (BID) from the background image generation unit 120, and converts the received background image data (BID) into a Luv coordinate system to generate Luv background image data (UBD) (S34_a).

Simultaneously, the Luv coordinate system conversion unit 130_a converts the XYZ image data (XID) received from the XYZ coordinate system conversion unit 110 or the background image generation unit 120 into the Luv coordinate system to generate Luv image data (UID) (S35_a).

Next, the color difference calculating unit 140_a receives the Luv image data (UID) and the Luv background image data (UBD) from the Luv coordinate system converting unit 130_a, and performs color difference calculation according to the Δu'v' standard to generate color difference image data (CID) (S50_a).

Next, the position weighting operation unit 150 receives color difference image data (CID) from the color difference calculation unit 140, and combines the received color difference image data (CID) with position weighted image data (PWD) to generate mura image data (MID) (S60).

Next, the mura data generation unit 160 receives the mura image data (MID) from the position weighting operation unit 150, and analyzes the received mura image data (MID) to calculate a color mura index (CMI) value (S70).

Figure 12:
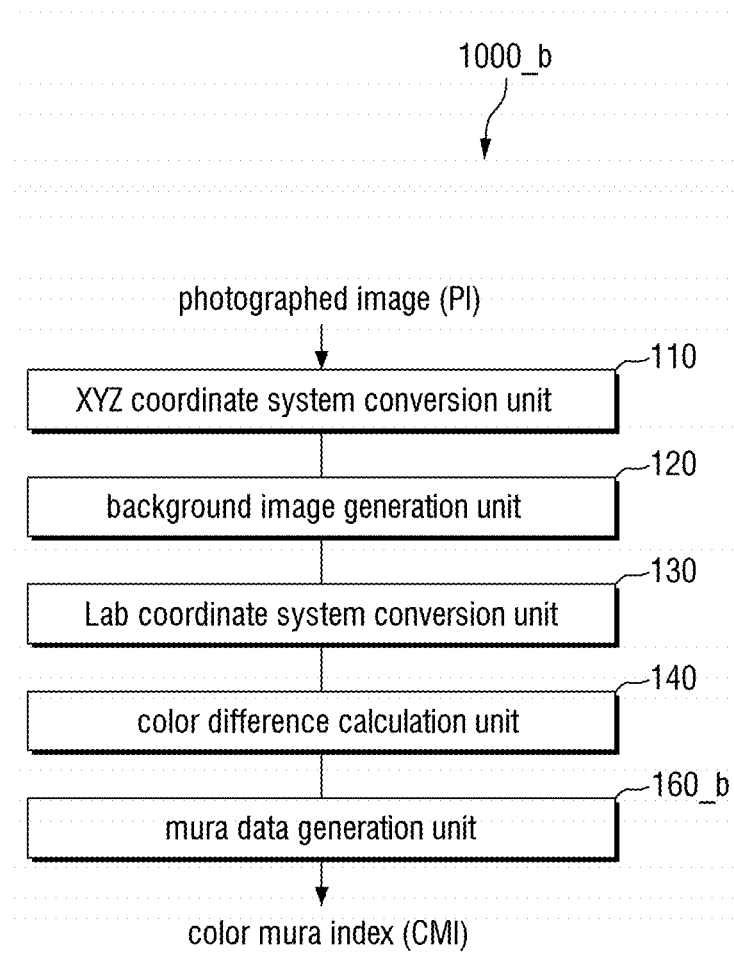
FIG. 12 is a block diagram of another exemplary embodiment of a mura detection device according to the invention.

FIG. 12 is a block diagram of a mura detection device according to another exemplary embodiment of the invention.

In FIG. 12, a description of configurations and reference numerals the same as those having been described in FIG. 2 will be omitted.

Referring to FIG. 12, the mura detection device 1000_b according to this exemplary embodiment includes an XYZ coordinate system conversion unit 110, a background image generation unit 120, a Lab coordinate system conversion unit 130, a color difference calculation unit 140, and a mura data generation unit 160_b.

The mura detection device 1000_b according to this exemplary embodiment is different from the mura detection device 1000 shown in FIG. 2, in that the position weighting operation unit 150 is not provided.

Therefore, the mura data generation unit 160_b may receive color difference image data (CID) from the color difference calculation unit 140, and detects the maximum luminance of the received color difference image data (CID) to output a color mura index (CMI) value.

Figure 13:
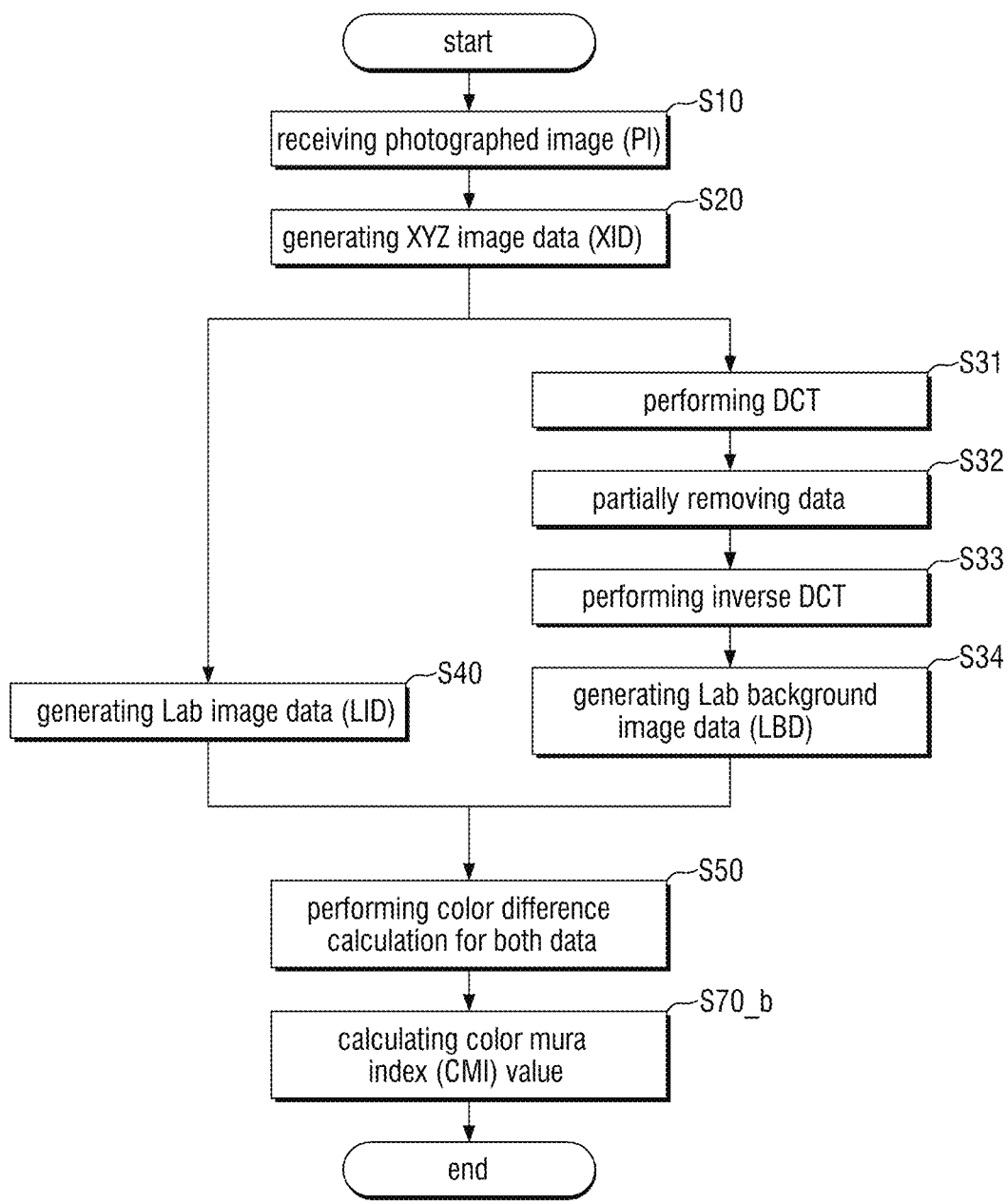
FIG. 13 is a flowchart illustrating a method of detecting mura using the mura detection device shown in FIG. 12.

FIG. 13 is a flowchart illustrating a method of detecting mura using the mura detection device shown in FIG. 12.

Referring to FIGS. 1, 12 and 13, the photograph device 2000 photographs the display device 3000, in which a test image TI is displayed, to form a photographed image PI, and the XYZ coordinate system conversion unit 110 receives the photographed image PI (S10).

Next, the XYZ coordinate system conversion unit 110 converts data of the photographed image PI into XYZ image data (XID) which is data according to the XYZ coordinate system (S20).

Next, the background image generation unit 120 performs discrete cosine transform (DCT) on the provided XYZ image data (XID) (S31), removes some data (S32), and then performs inverse discrete cosine transform (DCT) again to generate background image data (BID) (S33).

Next, the Lab coordinate system conversion unit 130 receives the background image data (BID) from the background image generation unit 120, and converts the received background image data (BID) into a Lab coordinate system to generate Lab background image data (LBD) (S34).

Simultaneously, the Lab coordinate system conversion unit 130 converts the XYZ image data (XID) received from the XYZ coordinate system conversion unit 110 or the background image generation unit 120 into the Lab coordinate system to generate Lab image data (LID) (S40).

Next, the color difference calculating unit 140 receives the Lab image data (LID) and the Lab background image data (LBD) from the Lab coordinate system converting unit 130, and performs color difference calculation according to the DE2000 standard to generate color difference image data (CID) (S50).

Next, the mura data generation unit 160_b receives the color difference image data (CID) from the color difference calculating unit 140, and analyzes the color difference image data (CID) to calculate a color mura index (CMI) value (S70_b).

Figure 14:
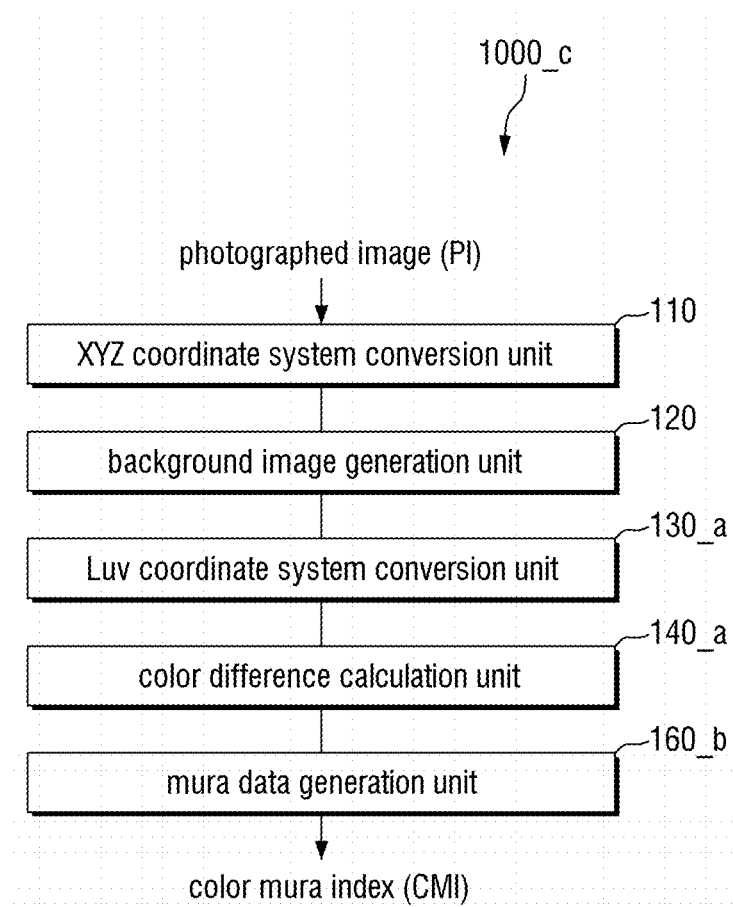
FIG. 14 is a block diagram of another exemplary embodiment of a mura detection device according to the invention.

FIG. 14 is a block diagram of a mura detection device according to another exemplary embodiment of the invention.

In FIG. 14, a description of configurations and reference numerals the same as those having been described in FIGS. 2, 10 and 12 will be omitted.

Referring to FIGS. 1 and 14, the mura detection device 1000_c according to this exemplary embodiment includes an XYZ coordinate system conversion unit 110, a background image generation unit 120, a Luv coordinate system conversion unit 130_a, a color difference calculation unit 140_a, and a mura data generation unit 160_b.

The mura detection device 1000_c according to this exemplary embodiment is different from the mura detection device 1000 shown in FIG. 2, in that the Luv coordinate system conversion unit 130_a is provided instead of the Lab coordinate system conversion unit 130, the operation method in the color difference calculation unit 140_a is different, and the position weighting operation unit 150 is not provided.

Therefore, the Luv coordinate system conversion unit 130_a may receive XYZ image data (XID) through the XYZ coordinate system conversion unit 110 or the background image generation unit 120, may receive background image data (BID) through the background image generation unit 120, may generate Luv image data (UID), and may generate Luv background image data (UBD).

Further, the color difference calculation unit 140_a receives the Luv image data (UID) and the Luv background image data (UBD) from the Luv coordinate system conversion unit 130_a, and compares the Luv image data (UID) and the Luv background image data (UBD) to generate color difference image data (CID). Here, the color difference image data (CID) may be operated and calculated according to the Δu'v' standard.

Moreover, the mura data generation unit 160_b may receive color difference image data (CID) from the color difference calculation unit 140_a, and detects the maximum luminance of the received color difference image data (CID) to output a color mura index (CMI) value.

Figure 15:
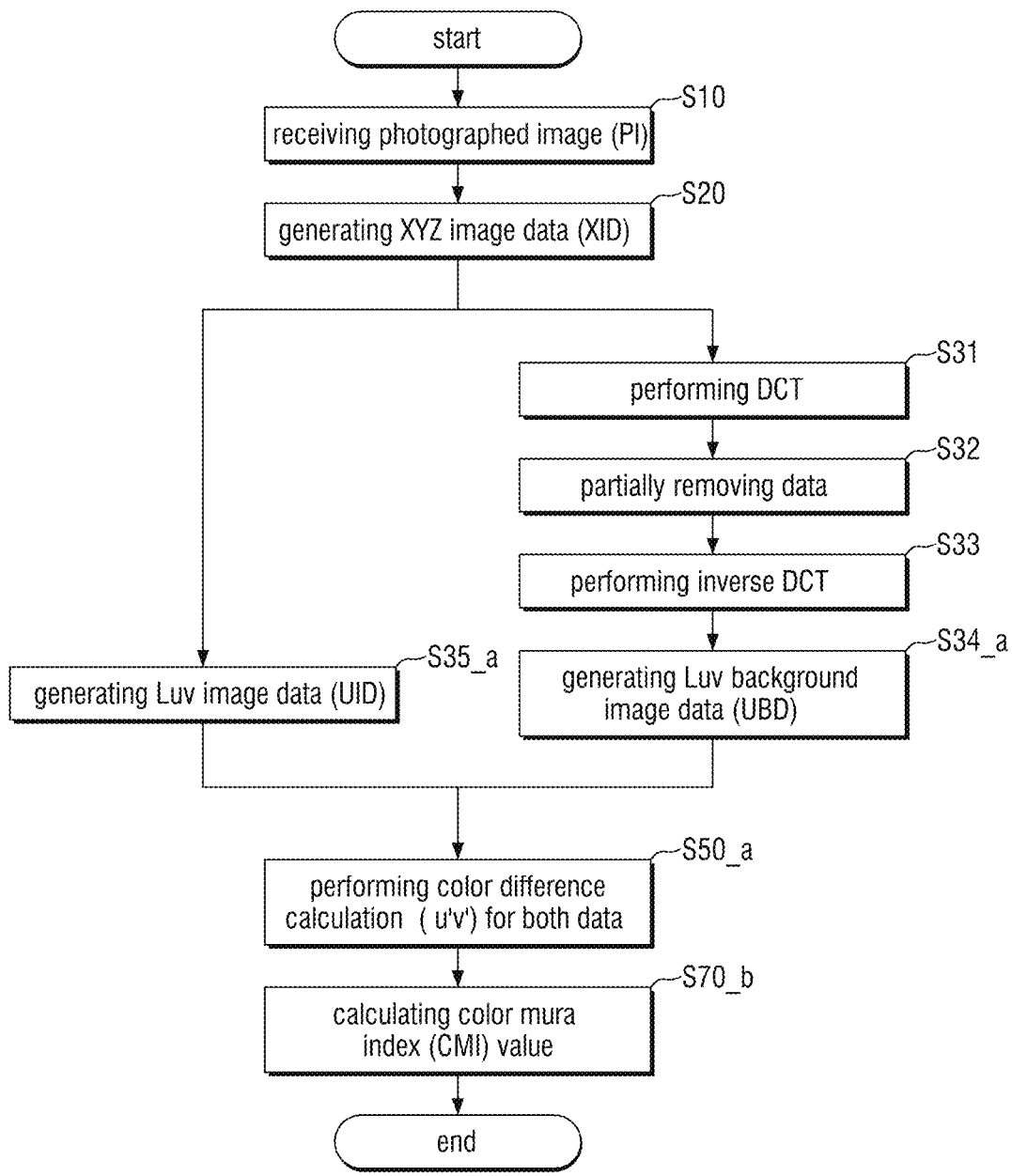
FIG. 15 is a flowchart illustrating a method of detecting mura using the mura detection device shown in FIG. 14.

FIG. 15 is a flowchart illustrating a method of detecting mura using the mura detection device shown in FIG. 14.

Referring to FIGS. 1, 14 and 15, the photograph device 2000 photographs the display device 3000, in which a test image TI is displayed, to form a photographed image PI, and the XYZ coordinate system conversion unit 110 receives the photographed image PI (S10).

Next, the XYZ coordinate system conversion unit 110 converts data of the photographed image PI into XYZ image data (XID) which is data according to the XYZ coordinate system (S20).

Next, the background image generation unit 120 performs discrete cosine transform (DCT) on the provided XYZ image data (XID) (S31), removes some data (S32), and then performs inverse discrete cosine transform (DCT) again to generate background image data (BID) (S33).

Next, the Luv coordinate system conversion unit 130_a receives the background image data (BID) from the background image generation unit 120, and converts the received background image data (BID) into a Luv coordinate system to generate Luv background image data (UBD) (S34_a).

Simultaneously, the Luv coordinate system conversion unit 130_a converts the XYZ image data (XID) received from the XYZ coordinate system conversion unit 110 or the background image generation unit 120 into the Luv coordinate system to generate Luv image data (UID) (S35_a).

Next, the color difference calculating unit 140_a receives the Luv image data (UID) and the Luv background image data (UBD) from the Luv coordinate system converting unit 130_a, and performs color difference calculation according to the $\Delta u'v'$ standard to generate color difference image data (CID) (S50_a).

Next, the mura data generation unit 160_b receives the color difference image data (CID) from the color difference calculating unit 140_a, and analyzes the received color difference image data (CID) to calculate a color mura index (CMI) value (S70_b).

The aforementioned embodiments may be implemented with hardware components, software components, and/or a combination of hardware components and software components. In an exemplary embodiment, these embodiments may be implemented by using one or more general-purpose computers or special-purpose computers, such as a processor, a controller, an arithmetic logic unit ("ALU"), a digital signal processor, a microcomputer, a field programmable gate array ("FPGA"), a programmable logic unit ("PLU"), and any other device capable of executing and responding to instructions, for example. A processing apparatus may execute an operating system ("OS") and one or more software applications running on the operating system. In addition, the processing apparatus may access, store, manipulate, process, and generate data in response to the execution of the software applications. For convenience of understanding, the processing apparatus may be described as being used singly, but those skilled in the art will recognize that the processing apparatus may have a plurality of processing elements and/or various types of processing elements. In an exemplary embodiment, the processing apparatus may include a plurality of processors or one processor and one controller, for example. Other processing configurations, such as a parallel processor, are also possible.

Software may include computer programs, codes, instructions, or on or more combinations thereof, and may constitute the processing apparatus to operate as desired or to command the processing apparatus independently or collectively. Software and/or data may be permanently or temporarily embodied in any type of machine, component, physical device, virtual equipment, computer storage medium or device, or transmitted signal wave in order to be interpreted by the processing apparatus or to provide instructions or data to the processing apparatus. The software may be distributed over a networked computer system, and may be stored and executed in a distributed manner. The software and data may be stored in one or more computer-readable recording media.

The method according to an exemplary embodiment may be implemented in the form of a program command capable of being executed through various computer means, and may be recorded in a computer-readable medium. The computer-readable medium may include program instructions, data files, data structures, and the like, alone or in combination. The program instructions recorded on the medium may be those specially designed and constructed for the exemplary embodiment, or may be available to those skilled in the art of computer software. Examples of the computer-readable medium may include magnetic media such as hard disk, floppy disk, and magnetic tape, optical media such as CD-ROM and DVD, magneto-optical media such as floptical disk, and hardware devices, such as ROM, RAM, and flash memory, which specially store and execute program instructions. Examples of program instructions include machine language codes such as those produced by a compiler, as well as high-level language codes that can be executed by a computer using an interpreter or the like. The aforementioned hardware device may operate as one or more software modules to perform the operations of the exemplary embodiments, and vice versa.

As described above, although the exemplary embodiments have been described with reference to the limited drawings, those skilled in the art may apply various technical modifications and variations based on the above description. In the exemplary embodiments, appropriate results can be achieved even when the described technique may be performed in a different order from the described method and/or the elements of the described system, structure, device, circuit and the like may be combined in a different form or replaced or substituted by other elements or equivalents.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A mura detection device, comprising:
   an XYZ coordinate system conversion unit which receives a photographed image of a display device and convers the photographed image into XYZ image data according to XYZ chromatic coordinates;
   a background image generation unit which generates background image data obtained by removing a part of the XYZ image data;
   a color difference calculation unit which generates color difference image data by comparing the photographed image and the background image data; and
   a mura data generation unit which calculates a color mura index value using the color difference image data,
   wherein the color mura index value corresponds to a maximum luminance value of the color difference image data.

2. The mura detection device of claim 1, further comprising:
   a Lab coordinate system conversion unit which converts the XYZ image data into a Lab image data according to Lab chromatic coordinates.

3. The mura detection device of claim 2,
wherein the Lab coordinate system conversion unit converts the background image data into a Lab background image data according to the Lab chromatic coordinates.

4. The mura detection device of claim 3,
wherein the color difference calculation unit performs color difference calculation for the Lab image data and the Lab background image data according to DE2000 standard to generate the color difference image data.

5. The mura detection device of claim 1,
wherein the background image generation unit receives the XYZ image data and performs discrete cosine transform (DCT) of the XYZ image data, removes a part of data for high-frequency components, and performs inverse discrete cosine transform (IDCT), so as to generate the background image data.

6. A mura detection device, comprising:
an XYZ coordinate system conversion unit which receives a photographed image of a display device and convers the photographed image into XYZ image data according to XYZ chromatic coordinates;
a background image generation unit which generates background image data obtained by removing a part of the XYZ image data;
a color difference calculation unit which generates color difference image data by comparing the photographed image and the background image data;
a mura data generation unit which calculates a color mura index value using the color difference image data; and
a position weighting operation unit which combines the color difference image data with position weighted image data.

7. The mura detection device of claim 6,
wherein the color difference image data is combined with the position weighted image data by convolution operation.

8. The mura detection device of claim 6,
wherein the mage implemented by the position weighted image data has luminance which is lowered from a center of a display area toward an edge of the display area.

9. The mura detection device of claim 1, further comprising:
an Luv coordinate system conversion unit which converts the XYZ image data into an Luv image data according to Luv chromatic coordinates.

10. The mura detection device of claim 9,
wherein the Luv coordinate system conversion unit converts the background image data into an Luv background image data according to the Luv chromatic coordinates.

11. The mura detection device of claim 10,
wherein the color difference calculation unit performs color difference calculation for the Luv image data and the Luv background image data according to Δu'v' standard to generate the color difference image data.

12. A method of detecting mura, the method comprising:
receiving a photographed image;
converting the photographed image into an XYZ image data according to XYZ chromatic coordinates;
removing a part of the XYZ image data to generate a background image data;
comparing the XYZ image data and the background image data to generate color difference image data; and
calculating a color mura index value using the color difference image data,
wherein the color mura index value corresponds to a maximum luminance value of the color difference image data.

13. The method of claim 12, further comprising, after the generating the background image data:
converting the XYZ image data into a Lab image data according to Lab chromatic coordinates; and
converting the background image data into a Lab background image data according to the Lab chromatic coordinates.

14. The method of claim 13,
wherein, in the generating the color difference image data, color difference calculation for the Lab image data and the Lab background image data is performed according to DE2000 standard.

15. The method of claim 12,
wherein the generating the background image data includes:
performing discrete cosine transform of the XYZ image data;
removing a part of data for high-frequency components; and
performing inverse discrete cosine transform to generate the background image data.

16. The method of claim 12, further comprising, after the generating the color difference image data:
performing convolution operation of the color difference image data and position weighted image data.

17. The method of claim 12, further comprising, after the generating the background image data:
converting the XYZ image data into an Luv image data according to Luv chromatic coordinates; and
converting the background image data into an Luv background image data according to the Luv chromatic coordinates.

18. The method of claim 17,
wherein, in the generating the color difference image data, color difference calculation for the Luv image data and the Luv background image data is performed according to Δu'v' standard.

\* \* \* \* \*